United States Patent
Dong

(10) Patent No.: US 6,396,388 B1
(45) Date of Patent: May 28, 2002

(54) REMOTE STARTING DEVICE FOR CARS

(76) Inventor: Dawei Dong, 44121 So. Grimmer Blvd., Fremont, CA (US) 94538

(*) Notice: Subject to any disclaimer, the term of this patent is extended or adjusted under 35 U.S.C. 154(b) by 0 days.

(21) Appl. No.: 09/320,247

(22) Filed: May 26, 1999

(51) Int. Cl.[7] .......................... B60R 25/10; B60R 22/00; F02N 17/00; F02N 1/00
(52) U.S. Cl. ................ 340/5.62; 123/179.2; 123/179.1; 123/179.25; 123/185.1; 307/10.6; 340/426
(58) Field of Search ................................ 340/426, 5.54, 340/5.51, 5.62; 307/10.3–10.6; 123/179.1, 179.2, 179.4, 179.25, 185.1, 179.3

(56) References Cited

U.S. PATENT DOCUMENTS 5,801,614 A * 9/1998 Kokubu

* cited by examiner

Primary Examiner—Michael Horabik
Assistant Examiner—Mai Nguyen
(74) Attorney, Agent, or Firm—The Kline Law Firm

(57) ABSTRACT

A remote starting device intended chiefly for use in cars that utilizes a pulse signal that is generated by either an RF transmitter, a keypad, or a telephone. The pulse signal is transmitted to a rotating drive attached to the subject ignition. When the device receives the pulse signal, the rotating drive rotates to activate the ignition of the car, thereby starting the engine. The remote starting device operates independently of the car's circuitry using only the car's battery, via the cigarette lighter, as a power source. There is no need to modify the car's electrical system to install the device. This greatly simplifies installation of the device and does not jeopardize any applicable warranty on the car.

6 Claims, 8 Drawing Sheets

REMOTE STARTING DEVICE FOR CARS

FIELD OF THE INVENTION

The present invention relates generally to automotive products, and more particularly is a remote starting device for cars.

BACKGROUND OF THE INVENTION

There are devices in the prior art directed to the remote starting of car engines. Two of the devices that are currently available are the AutoCommand™ produced by Designtech International, Inc., USA, and the Remote Car Starter™ produced by Bulldog Security USA. These remote control car starters allow one to start his car before he has entered the car. If the car is within the range of the device, it allows the user to start the car while he is inside his home or office. This allows the user to not have to wait in his car for the engine to warm up on cold days, or for the air conditioner to take effect on hot days.

However, the prior art devices are subject to at least two major disadvantages:

(1) When installing the device, the user must install the receiver in the original automobile electric circuit. In other words, in order for the prior art device to function, you must cut into the original electric circuit of the car and insert the receiver into the factory-installed circuit. This is a complicated task, and it is very difficult to perform without the assistance of professionals. In addition, there is another drawback, particularly for the owners of new cars. The owners are hesitant to modify the electrical circuits of their car because if the circuitry is damaged during installation of the device, the manufacturer will not honor the warranty due to the alteration of the circuit. Car owners must therefore give serious consideration before they spend money on the installation of the prior art devices.

(2) The effective range of the products on the market is quite limited. Usually, the devices work well only within a range of 100 feet. Cars cannot be started by the devices if they are park greater than 100 feet from the user.

Accordingly, it is an object of the present invention to provide a remote starting device that can be installed on a vehicle without alteration of the electrical circuit of the vehicle.

It is a further object of the present invention to provide a device that has a range far in excess of 100 feet.

SUMMARY OF THE INVENTION

The present invention is a remote starting device for cars. The device utilizes a pulse signal that is generated by either an RF transmitter, a keypad, or a telephone. The pulse signal is transmitted to a rotating drive attached to the subject ignition. When the device receives the pulse signal, the rotating drive rotates to activate the ignition of the car, thereby starting the engine. The remote starting device operates independently of the car's circuitry using only the car's battery, via the cigarette lighter, as a power source. There is no need to modify the car's electrical system to install the device. This greatly simplifies installation of the device and does not jeopardize any applicable warranty on the car.

An advantage of the present invention is that it can start a car before the user enters the car, and it can do so from a nearly unlimited range. By utilizing a telephone paging system, the device eliminates the distance-limitations inherent in an ordinary RF transmitter.

Another advantage of the present invention is that it does not require modification of the car's electrical system.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

The present invention is a remote starting device for cars and other vehicles utilizing a rotating ignition switch. The device is operated by a pulse signal that is generated by an actuating means that generates a triggering signal. The actuating means will typically be an RF transmitter, a keypad, or a telephone.

Figure 1:
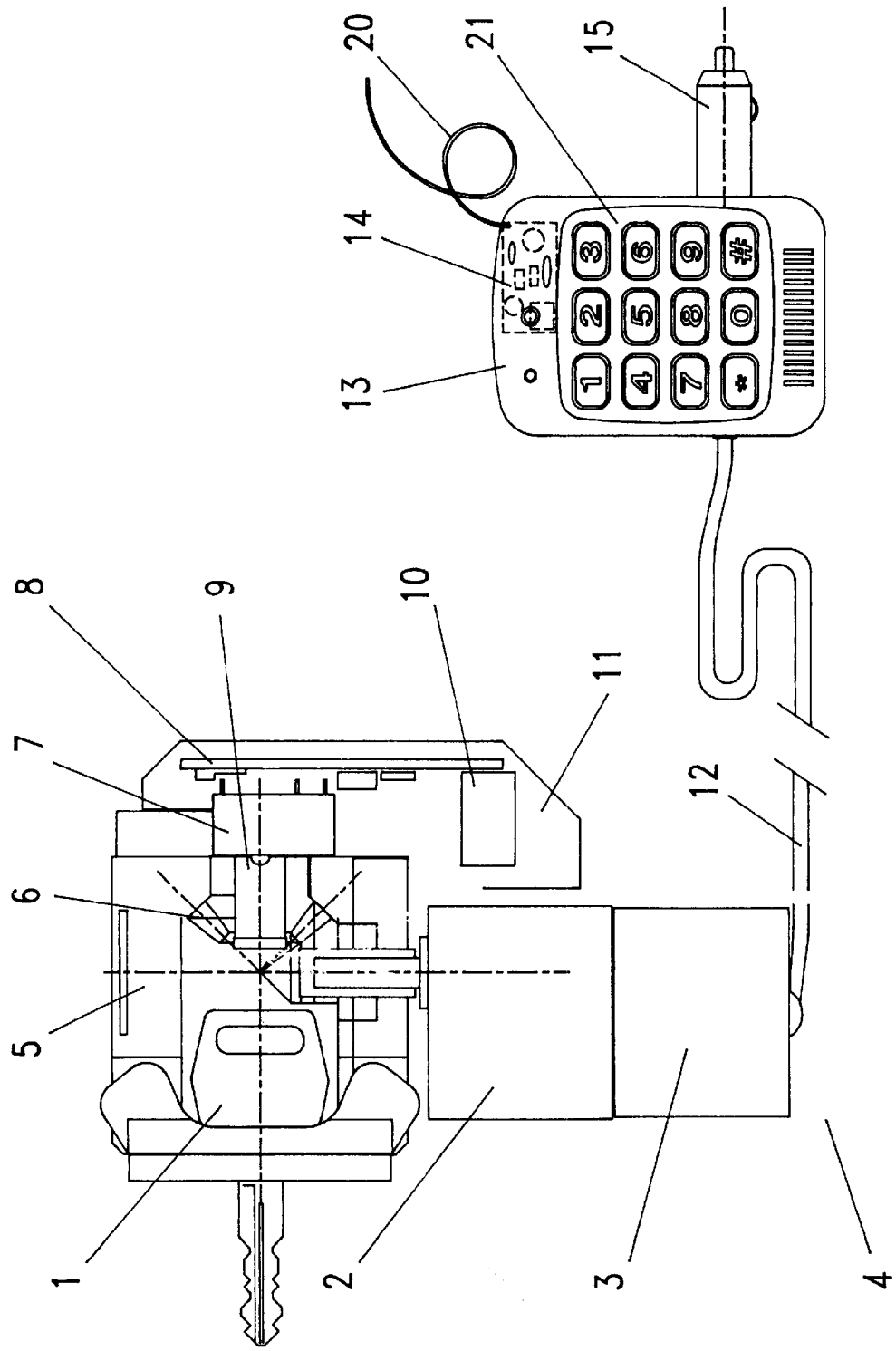
FIG. 1 is a side sectional view of the remote starting device of the present invention as installed on a vehicle.
Figure 4:
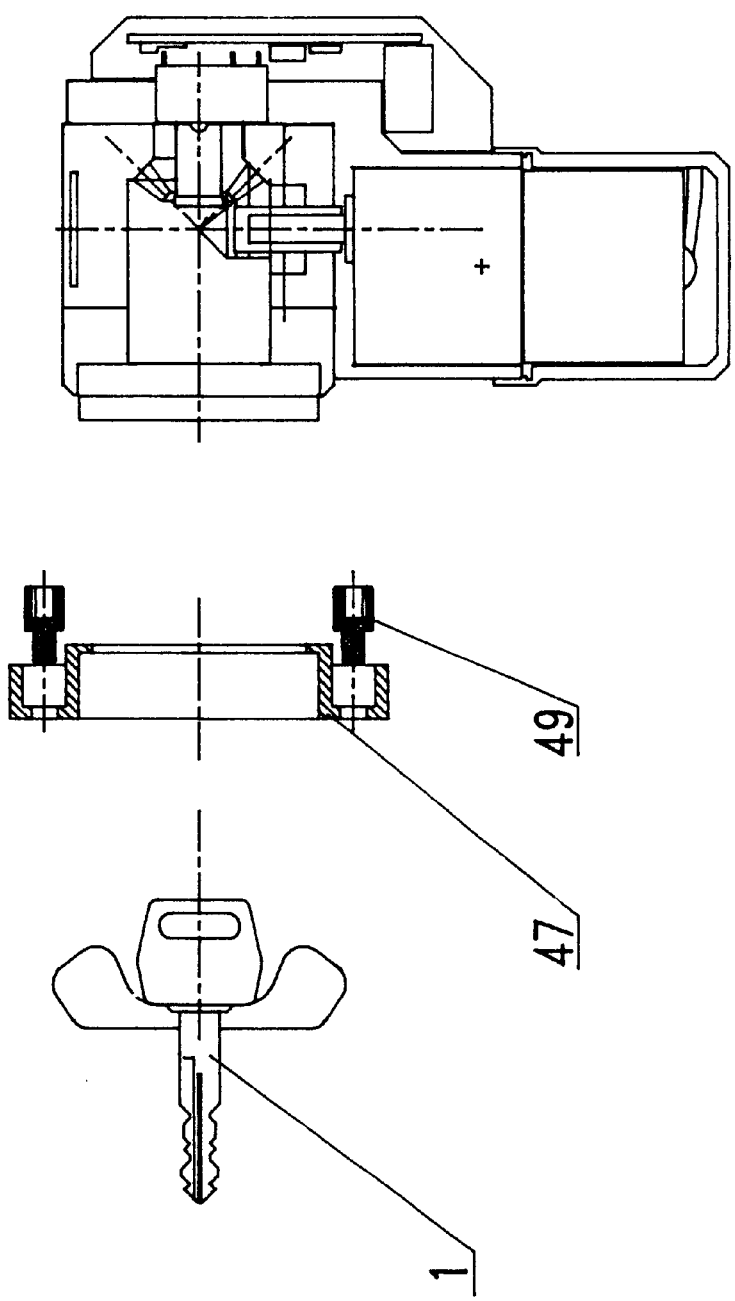
FIG. 4 shows the physical connection of the starting device to the ignition of the car.
Figure 4B:
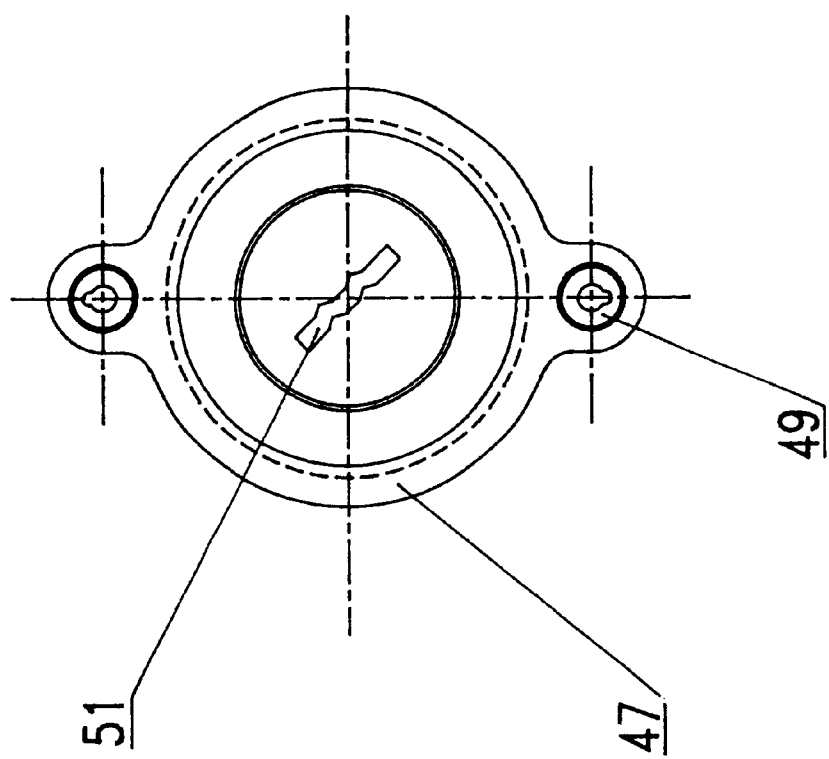
FIG. 4b shows the linking ring that accomplishes the connection.
Figure 4C:
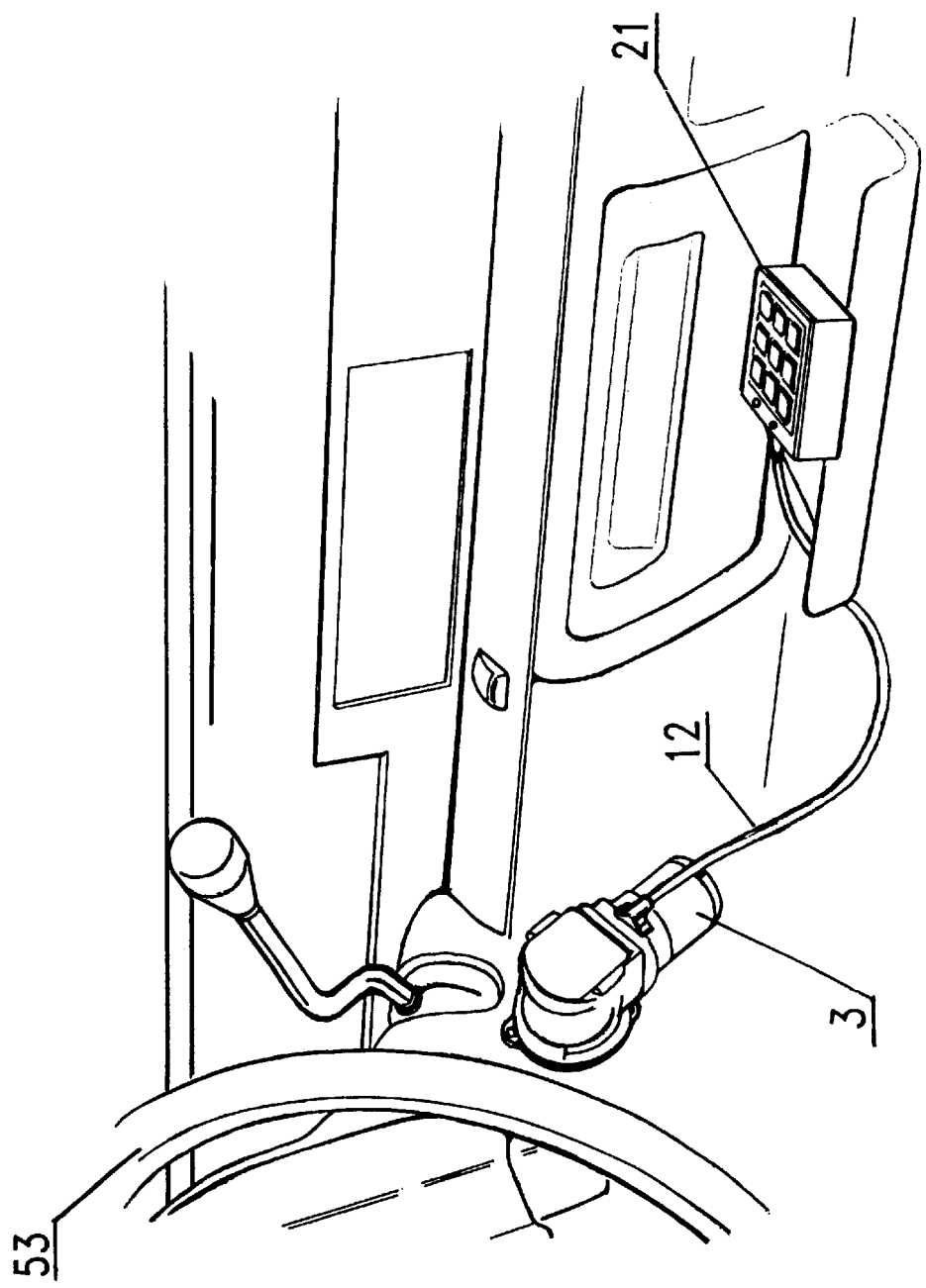
FIG. 4c shows the starting device installed in a car.

Referring first to FIG. 1, the starting device comprises a housing containing a rotating drive 5 in an upper portion. The rotating drive 5 is physically connected to the key 1 that operates the ignition of the car. The key 1 is placed in the ignition of the car when the starting device is installed, and is covered by the device. When the rotating drive 5 of the device rotates, the key 1 and the ignition are turned, and the car is started. The starting device is secured to the steering column of the car via a mounting collar 47 that is secured by screws 49. (See-FIG. 4.)

The rotating drive 5 is powered by a DC motor 3 covered by a motor case 4 at a lower end of the device. The DC motor 3 drives a gear box 2 that is connected to a bevel gear 6 on the main shaft 9 of the starting device. The rotating drive 5 physically actuates the key 1 ignition of the car when the rotating drive 5 rotates.

A circuitry compartment 11 contains the controlling electrical circuitry of the starting device. The chief electronic components are a PCB 8, a main motor relay 10, and a multi-position limit switch 7 with contact positions 7a–d.

The starting device is operated by a control mechanism 13 that is connected to the main body of the device by an electrical cable 12. The control mechanism includes a PCB of an RF receiver 14 with an RF antenna 20. The control mechanism also includes a lighter adapter plug 15 that is inserted in to the cigarette lighter of the car to draw power from the car battery.

A keypad 21 is provided to facilitate user input. The keypad 21 serves two important functions. First, a PIN number must be entered through the keypad 21 after a user enters the car. If the PIN is not properly entered, the device will turn the ignition to the off position, and the starting device will not function further. This feature provides security against intruders into the car. The keypad 21 may also be used to enter the to start the engine. By entering the proper code on the keypad 21, a user activates the rotating drive 5, and the engine is started. Similarly, the user can use the keypad 21 to turn off the engine.

The starting device is constructed so that it can be actuated in a variety of ways. The basic unit includes an RF transmitter 16 that is carried by the user. To give the starting device of the present invention essentially unlimited range, a pager means 45 is included in the control mechanism 13. The pager 45 can be triggered by any telephone. Therefore, with a pager 45 included in the control mechanism 13, the user can actuate the starting device from anywhere that a phone call can be completed. However, the user must know both the pager number and the starting code to activate the device. If either number is unknown to a user, the device cannot be operated.

Figure 2:
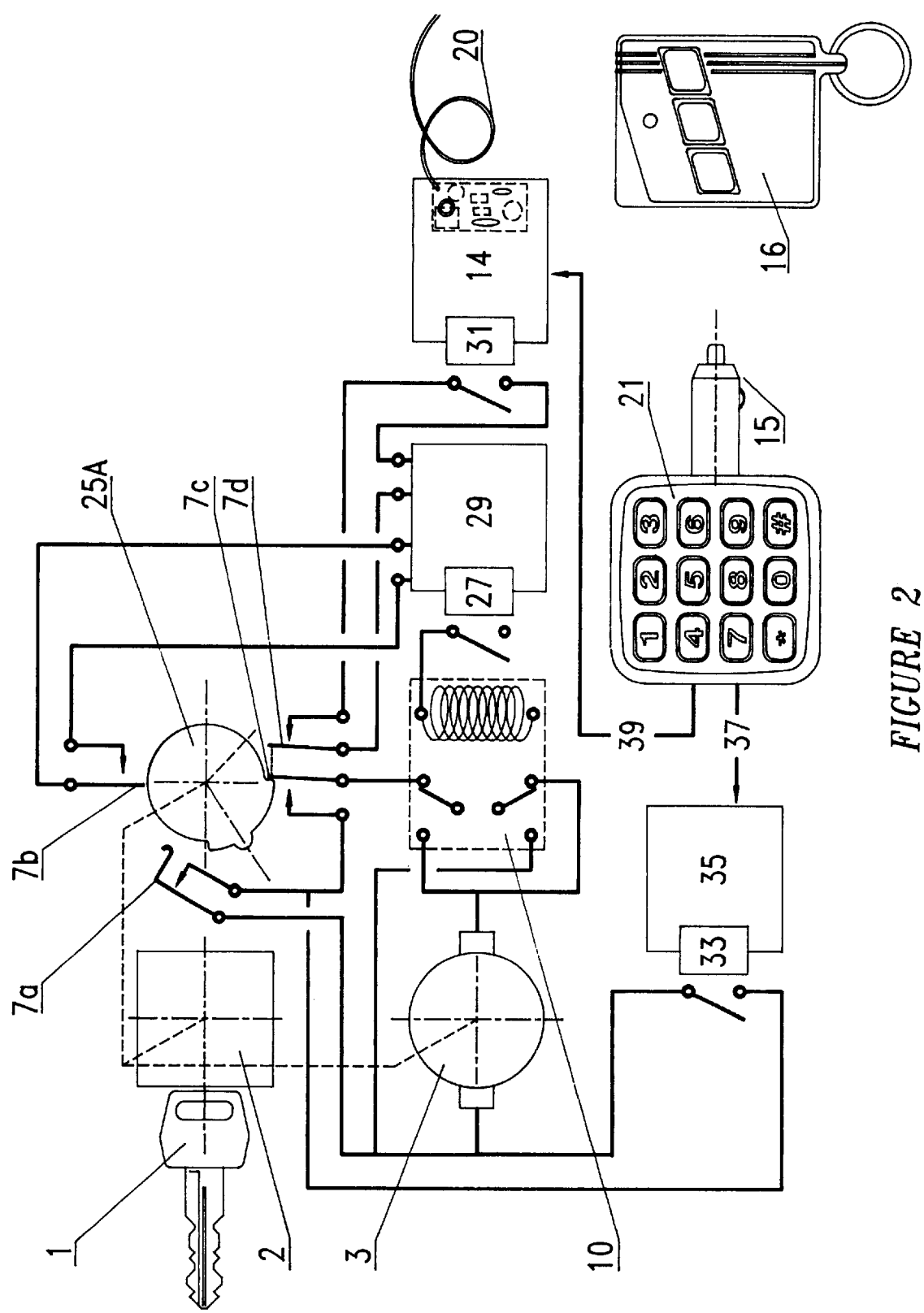
FIG. 2 is a schematic circuit diagram for the device.
Figure 3:
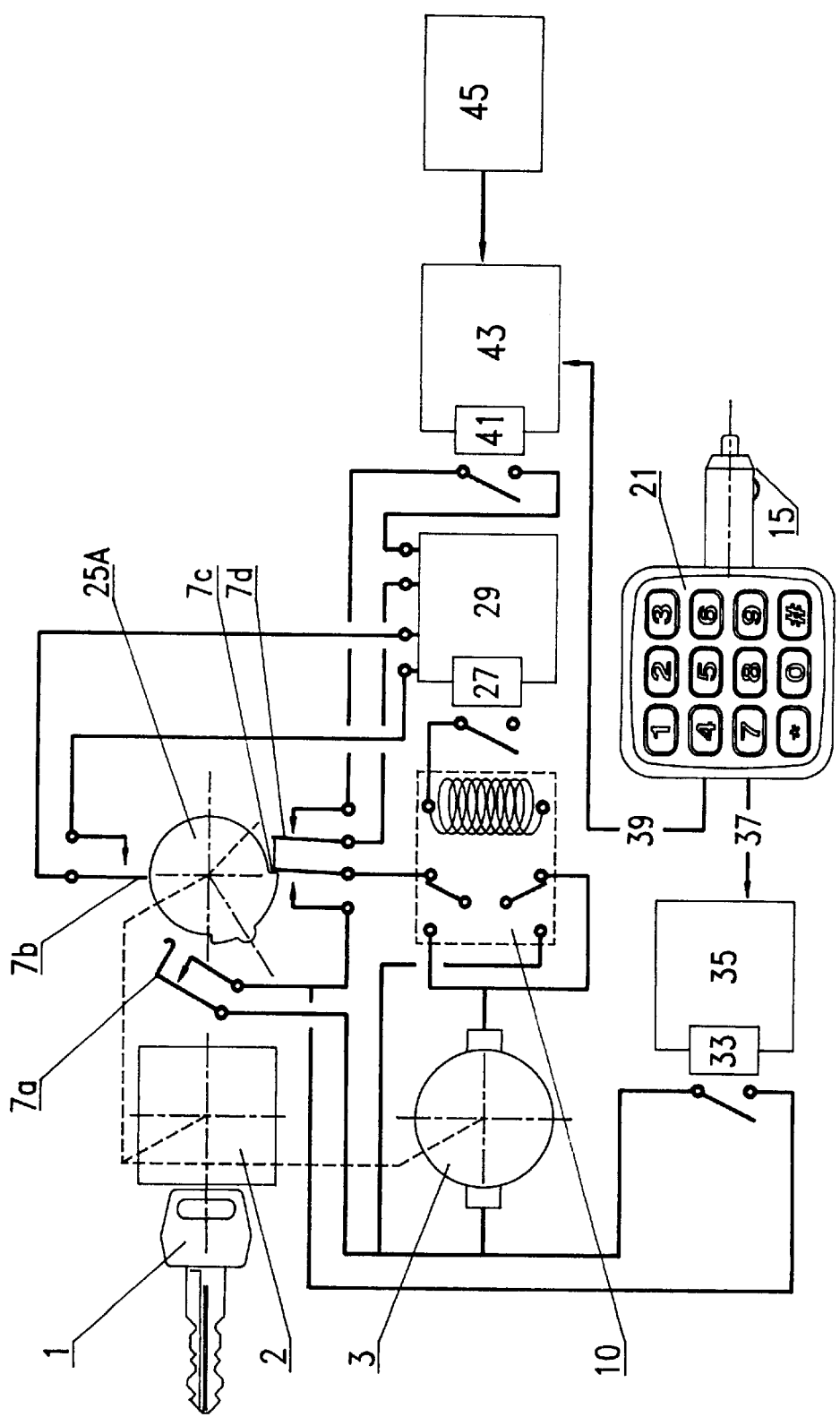
FIG. 3 is a schematic circuit diagram for the device with a paging mechanism included.

Operation of the circuitry can best be understood with reference to FIGS. 2 and 3. The device is remotely triggered either by the RF transmitter 16 (FIG. 2) or a telephone generating a signal received by a pager means 45 (FIG. 3). The triggering signal for the device is generated either by the RF receiver 14 with starter relay 31, or by the pager 45 using a decoder 43 with relay 41. If the user enters the car, he can generate a triggering signal via the keypad 21 through decoder 43.

Referring now to FIG. 3, the pulse triggering. signal generated by either the remote triggering device 45, 16, or by the keypad 21 activates the timer 29 with relay 27. Once the timer 29 is activated, the user must key in the proper code on the keypad 21 within a predetermined time period, or the engine is automatically shut off. This timing function is useful for allowing the user to operate the engine of the car for a brief period without actually going to his car. The timer 29 also serves as a security device if an unauthorized person enters the vehicle after the starting device has been triggered. If the person entering the car does not enter the proper code within the predetermined time period, the engine automatically stops, disabling the vehicle When the triggering pulse is received by the device, it is also transmitted to the main relay 10 of the device. The main relay 10 operates the cam 25. The cam 25 rotates to the various contact positions (see FIGS. 2–2c) of the limit switch 7. The positions of the limit switch 7 are: 7a—operation position, 7b—starting motor to start the car engine (the switch returns to position 7a when the engine is started), 7c and 7d are linked to turn off the engine and wait for the next starting signal to be received.

Figure 2B:
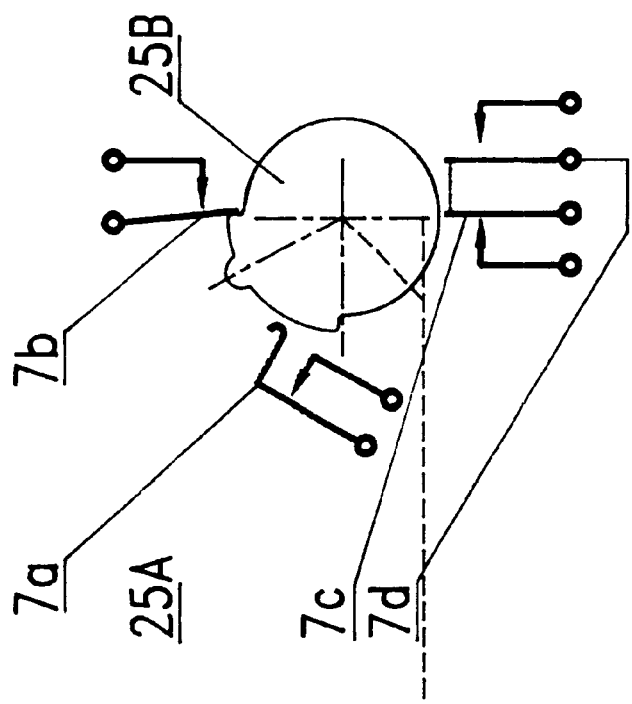
FIG. 2b shows the cam in the engine start position.
Figure 2C:
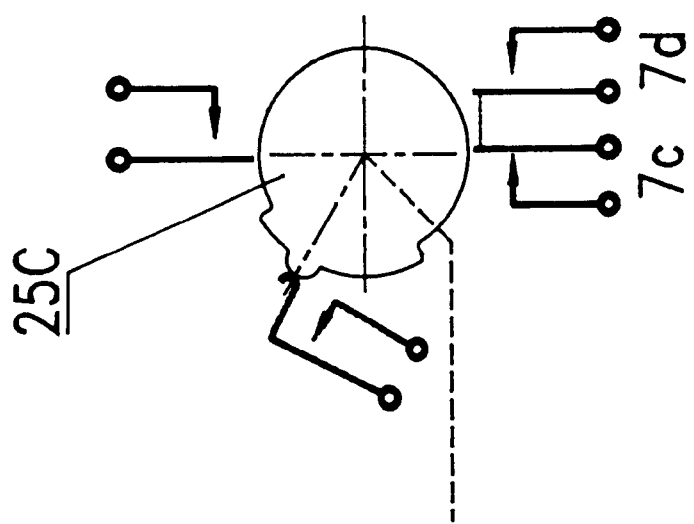
FIG. 2c shows the cam in the engine stop position.

When the cam 25 is in position 25A as shown in FIG. 2, the device is in standby mode. When the cam 25 is in position 25B as shown in FIG. 2B, the device rotates the rotating drive 5 to activate the starter of the car to start the engine. Finally, when cam 25 is in position 25C as shown in FIG. 2C, the engine is in running mode. Switch 7 is in position 7A, the operation position. The engine cannot be shut off until the stop command is entered into the keypad 21. This is important to protect the status of the device while the engine is running and the car is being driven, so that there will be no interference with the operation of the vehicle.

Thus when the starting device receives the triggering pulse signal, the cam 25 rotates to positions 25B, and starts the car. After the car is started, the cam 25 rotates to the standby position 25C. The cam 25 rotates to position 25A to turn off the engine. The signal to trigger the stop function and turn off the engine is accomplished by a signal generated by the timer 29 as described above, or by the user keying in the stop code on the keypad 21. The proper stop code generates a signal 37 that causes the stop decoder 35 with relay 33 to generate a signal to the main relay 10 to rotate the cam 25 to position 25A, thereby turning off the engine and putting the device in a state to await the next start signal.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A starting device adapted to be used with key-operated engines comprising:

a fixing means adapted to secure a housing of said starting device to an ignition means of an engine, a rotating drive to rotate a, key of the ignition means, device control circuitry to control a motor that drives said rotating drive, said device control circuitry is contained completely within said starting device so that said starting device operates independently of any circuitry of the engine, switching means to control operation of said motor, and actuating means to generate a triggering signal for said starting device, said triggering signal being received by said circuitry; wherein a user operates said actuating means to generate said triggering signal, said triggering signal causes said switching means to activate said motor, thereby causing said rotating drive to rotate and turn the key to activate the ignition means and to start the engine.

2. The starting device of claim 1 wherein:

said actuating means comprises a local signal generation means physically connected to the ignition, and a remote signal generation means that generates a signal from a position remote from the ignition.

3. The starting device of claim 2 wherein:

said remote signal generation means comprises a pager means that is triggered by a telephone.

4. The starting device of claim 2 wherein:

said remote signal generation means is an RF transmitter.

5. The starting device of claim 1 wherein:

said device control circuitry includes a timer and means for said timer to generate a stop signal that turns off said engine.

6. The starting device of claim 5 wherein:

said timer is disabled by the user supplying a security signal.

* * * * *